(12) United States Patent
Aviles et al.

(10) Patent No.: US 9,299,230 B2
(45) Date of Patent: Mar. 29, 2016

(54) MODULAR EXOSKELETAL FORCE FEEDBACK CONTROLLER

(71) Applicant: Novint Technologies, Inc., Rockville Centre, NY (US)

(72) Inventors: Walter A. Aviles, San Diego, CA (US); Frank E. Joutras, Lincoln, NE (US)

(73) Assignee: Facebook, Inc., Menlo Park, CA (US)

( * ) Notice: Subject to any disclaimer, the term of this patent is extended or adjusted under 35 U.S.C. 154(b) by 91 days.

(21) Appl. No.: 14/194,047

(22) Filed: Feb. 28, 2014

(65) Prior Publication Data

US 2014/0240109 A1 Aug. 28, 2014

Related U.S. Application Data

(60) Provisional application No. 61/771,015, filed on Feb. 28, 2013, provisional application No. 61/783,419, filed on Mar. 14, 2013.

(51) Int. Cl.
| | |
|---|---|
| *G08B 6/00* | (2006.01) |
| *B25J 9/00* | (2006.01) |
| *G06F 3/01* | (2006.01) |

(Continued)

(52) U.S. Cl.
CPC ............... *G08B 6/00* (2013.01); *A61H 1/0277* (2013.01); *A61H 1/0285* (2013.01); *B25J 9/0006* (2013.01); *B25J 13/025* (2013.01); *G06F 3/014* (2013.01); *G06F 3/016* (2013.01); *A61H 3/00* (2013.01); *A61H 2201/0107* (2013.01); *A61H 2201/0207* (2013.01); *A61H 2201/0214* (2013.01); *A61H 2201/1215* (2013.01); *A61H 2201/165* (2013.01); *A61H 2201/1635* (2013.01); *A61H 2201/501* (2013.01); *A61H 2201/5064* (2013.01); *A61H 2201/5069* (2013.01);

(Continued)

(58) Field of Classification Search
CPC .......... G08B 6/00; G06F 3/014; B25J 9/0006; B25J 13/025; A61H 1/0285; A61H 2201/1635; A61H 1/0274; A61B 5/103
USPC .................... 340/407.1; 414/4, 5; 463/36, 38; 700/245, 264; 600/587, 595
See application file for complete search history.

(56) References Cited

U.S. PATENT DOCUMENTS

| | | | | |
|---|---|---|---|---|
| 4,529,237 A | * | 7/1985 | Gupta et al. | 294/86.4 |
| 8,423,182 B2 | * | 4/2013 | Robinson et al. | 700/245 |

(Continued)

FOREIGN PATENT DOCUMENTS

EP 1364755 A1 11/2003

OTHER PUBLICATIONS http://www.engadget.com/2010/06/18/forcetek-xio-the-gaming-controller-that-hurts-you-not-the-tv/.

(Continued)

*Primary Examiner* — Hung T Nguyen
(74) *Attorney, Agent, or Firm* — Fenwick & West LLP

(57) ABSTRACT

Portable force feedback controllers (PFFCs) designed to be worn on a user's limb, track the movement of the user's limb, and provide force feedback capability. In some embodiments, the PFFCs may include interchangeable modules that can be quickly and easily connected and disconnected so that the PFFC may be easily modified for a particular application. In yet other embodiments, various PFFC modules are moveably coupled and have at least one degree of freedom so that the PFFC can accurately follow the natural movements of a user's limb.

18 Claims, 14 Drawing Sheets

(51) Int. Cl.
*B25J 13/02* (2006.01)
*A61H 1/02* (2006.01)
*A61H 3/00* (2006.01)

(52) U.S. Cl.
CPC . *A61H2201/5092* (2013.01); *A61H 2201/5097* (2013.01)

(56) References Cited

U.S. PATENT DOCUMENTS

| | | | | |
|---|---|---|---|---|
| 2003/0223844 | A1* | 12/2003 | Schiele et al. | 414/5 |
| 2006/0167564 | A1* | 7/2006 | Flaherty et al. | 623/57 |
| 2012/0142416 | A1 | 6/2012 | Joutras | |

OTHER PUBLICATIONS http://cyberneticzoo.com/teleoperators/1983-88-greenman-teleoperator/ 1983-88 "Greenman" Teleoperator—Smith & Armogida (American), last viewed on Feb. 28, 2014.
"Design of Exoskeleton Mechanism for the Shoulder Joint," by Papadopoulos et al., 12th IFToMM World Congress, Besancon (France), Jun. 18-21, 2007.
"Mechanical System Design of a Haptic Cobot Exoskelleton," A thesis presented to the faculty of the Russ College of Engineering and Technology of Ohio University by Eric B. LaFay, Jun. 2007.
"Multi-Fingered Exoskeleton Haptic Device Using Passive Force Feedback for Dexterous Teleoperation," by Koyanna et al., Proceedings of the 2002 IEEE/RSJ Intl. Conference on Intelligent Robots and Systems EPFL, Lausanne, Switzerland, Oct. 2002.
"Development of an Ultrasonic Clutch for Multi-Fingered Exoskeleton Haptic Device using Passive Force Feedback for Dexterous Teleoperation," by Koyanna et al., Proceedings of the 2003 IEEE/RSJ Intl. Conference on Intelligent Robots and Systems, Las Vegas, Nevada, Oct. 2003.
"Mechanical Design and Experimental Characterization of a Novel Hand Exoskeleton," by Fontana et al., PERCRO Laboratory, Scuola Superiore Sant'Anna, Pisa, Italy, XIX Congress, AIMETA, Association for Theorteical and Applied Mechanics, Ancona, Sep. 14-17, 2009.
"FlexTorque: Exoskeleton Interface for Haptic Interaction with the Digital World," by Tsetserukou et al., Toyohashi University of Technology, 1-1 Hibarigaoka, Tempaku-cho, Toyohashi, Aichi, 441-8580 Japan, A.M.L. Kappers et al. (Eds.): EuroHaptics 2010, Part II, LNCS 6192, pp. 166-171, 2010. © Springer-Verlag Berlin Heidelberg 2010.
1991 TOPS TeleOperator/TelePresence System—Smith and Shimamoto (America), Exoskeleton Archives—cyberneticzoo.com, Jan. 5, 2012.
"Arm Movement Recorder," by Chuanasa et al., Department of Mechanical Engineering, King Mongkut's University of Technology, Thonburi Bangkok, Thailand, Energy Research Journal 1 (2): 126-130, 2010, ISSN 1949-0151, © 2010 Science Publications.
"A 7 DOF Wearable Robotic Arm Using Pneumatic Actuators," by Younkoo Jeong et al., Korea Institute of Science & Technology, Proceedings of the 32nd ISR(International Symposium on Robotics), Apr. 19-21, 2001.
"Performance Enhancement of a Haptic Arm Exoskeleton," by Alan Sledd et al., Mechanical Engineering and Materials Science, Rice University, Houston TX, Symposium on Haptic Interfaces for Virtual Environment and Teleoperator Systems 2006, Mar. 25-26, Alexandria, Virginia, USA ©2006 IEEE.
"Design of a Haptic Arm Exoskeleton for Training and Rehabilitation," by Abhishek Gupta, Student Member, IEEE, and Marcia K. O'Malley, Member, IEEE, IEEE/ASME Transactions on Mechatronics, vol. 11, No. 3, pp. 280-289, Jun. 2006.
"Haptic Interfaces," by Marcia K. O'Malley, Abhishek Gupta, Library of Congress Cataloging-in-Publication Data, HCI beyond the GUI: design for haptic, speech, olfactory and other nontraditional interfaces/edited by Philip Kortum, (The Morgan Kaufmann series in interactive technologies—Includes bibliographical references and index.) ISBN-13:978-0-12-374017-5 (alk. paper) 1. Human-computer interaction. 2. Graphical user interfaces (Computer systems). QA76.9.H85H397 2008.
International Search Report and Written Opinion dated Apr. 28, 2014, in related International Application No. PCT/US2014/019533.
"An Arm Exoskeleton System for Teleoperation and Virtual Environments Application," by M. Bergamasco et al., pp. 1449-1454, IEEE 1994.

\* cited by examiner

MODULAR EXOSKELETAL FORCE FEEDBACK CONTROLLER

RELATED APPLICATION DATA

This application is a non-provisional of, and claims priority to, U.S. Provisional Patent Application Ser. No. 61/771,015, filed on Feb. 28, 2013, and titled "Modular Exoskeletal Force Feedback Controller," which is incorporated by reference herein in its entirety, and is also a non-provisional of, and claims priority to, U.S. Provisional Patent Application Ser. No. 61/783,419, filed on Mar. 14, 2013, and titled "Modular Exoskeletal Force Feedback Controller," which is incorporated by reference herein in its entirety.

FIELD OF THE INVENTION

The present invention generally relates to the field of force feedback controllers. In particular, the present invention is directed to modular exoskeletal force feedback controllers.

BACKGROUND

A Force Feedback Controller (FFC) is a type of human/computer interface that senses movement by a human operator and imparts forces on that operator. FFCs can utilize forces imparted on the operator to engage the operator's haptic perceptions. Users interfacing with non-computer tasks routinely exploit the combination of visual and haptic feedback (seeing one side of a task while feeling the other). Bringing this sensory combination into human-computer interfaces can have a variety benefits, including making such interfaces more efficient and more intuitive for the user, immersing the operator in events occurring in a computer simulation, and making such simulations feel more lifelike.

In general, FFCs can be part of the external environment (e.g., a force feedback joystick) or worn by the human operator (e.g., a force feedback glove). Benefits can be realized with an FFC that is wearable and portable, and FFCs that can impart a richer array of forces to generate more nuanced haptic perceptions. Existing portable FFCs, however, are deficient in a variety of ways, including being heavy, bulky, uncomfortable, costly to manufacture, limited in the sensory feedback they can impart, and an inability to precisely localize an imparted force at a particular location on the operator's body.

SUMMARY OF THE DISCLOSURE

In one implementation, the present disclosure is directed to a force feedback controller. The force feedback controller includes a wrist module, said wrist module including a first limb attachment configured to couple said force feedback controller to the user's arm; and a grip module coupled to said wrist module, said grip module being moveable in a first and second direction relative to said wrist module, said first direction being substantially perpendicular to said second direction, said grip module includes a linear slide mechanism having a grip attachment, said grip attachment constrained to linear motion in a third direction substantially perpendicular to at least one of said first and second directions, and wherein said grip attachment is configured to couple a grip to said grip module.

In another implementation, the present disclosure is directed to a force feedback controller. The force feedback controller includes a wrist module, said wrist module including a first limb attachment configured to couple to a first portion of a user's arm; a forearm module, said forearm module including a second limb attachment configured to couple to a second portion of the user's arm; and an exoskeleton member having a first end and a second end, said forearm module coupled to said first end, and said wrist module coupled to said second end, said exoskeleton member includes a torsion module, said torsion module having a torsion element configured to allow relative torsional movement between said forearm module and said wrist module, and substantially prevent relative axial movement between said forearm module and said wrist module.

In yet another implementation, the present disclosure is directed to a force feedback controller exoskeleton. The force feedback controller exoskeleton includes a forearm module, a wrist module, and a grip module, said forearm module and said wrist module being designed and configured to removeably couple together to form said force feedback exoskeleton controller, and said grip module being moveably coupled to said wrist module and having at least one degree of freedom of movement relative to said wrist module; and said grip module including a linear slide mechanism and a grip coupled to said linear slide mechanism, said grip constrained to movement in a linear direction relative to said wrist module.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
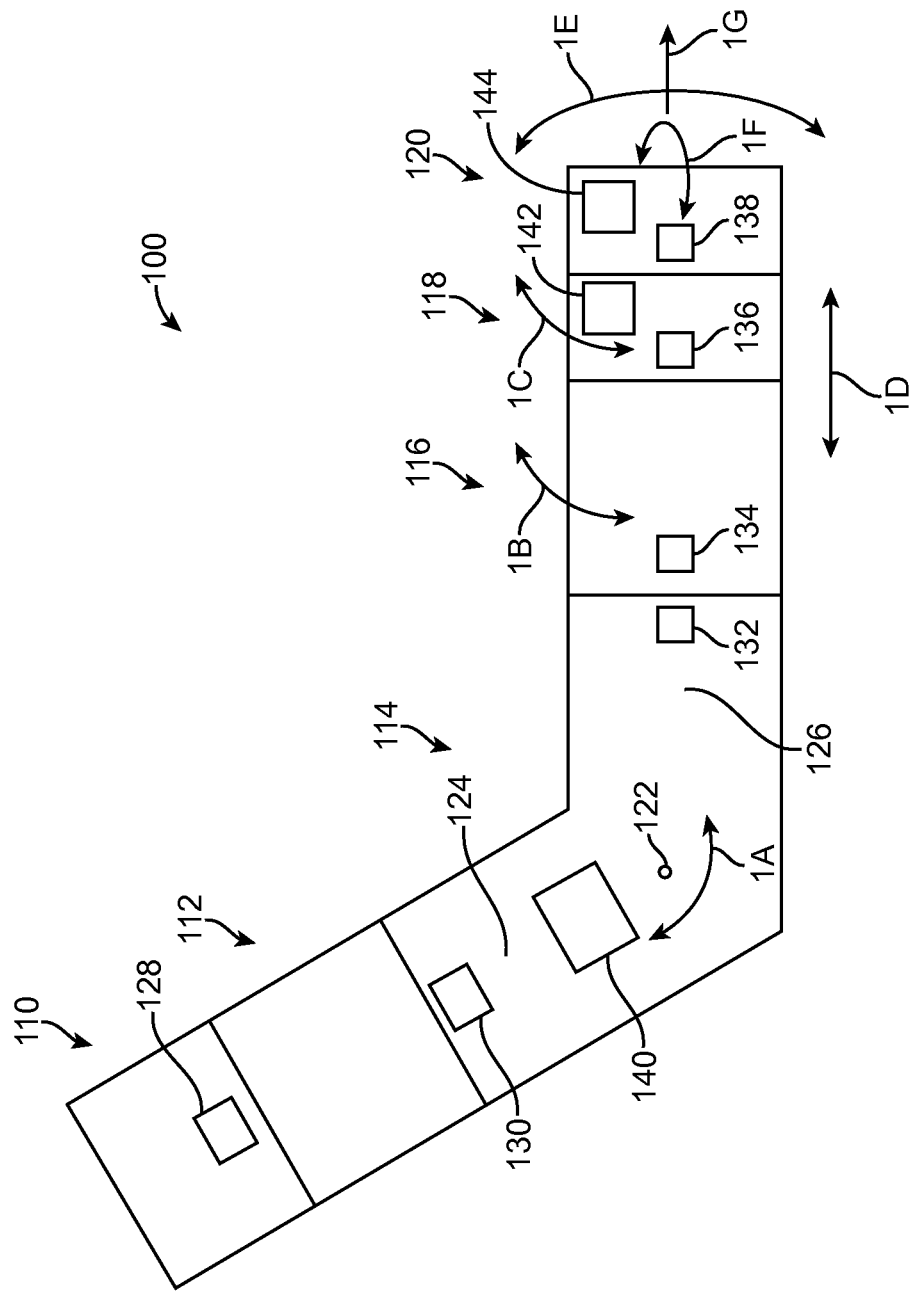
FIG. 1 illustrates an exemplary modular and portable force feedback controller.

Some aspects of the present invention include various portable FFC (PFFC) devices and systems for improved human-computer interfacing and computer simulation control. The PFFCs described herein can be used in a variety of applications, including to augment the precision and/or strength of a human operator, and to improve the efficiency and quality of interaction between an operator and synthetic environments in applications such as computer simulations, data exploration and games. The PFFCs described herein may also be used to help measure, guide, exercise, or reinforce human operator movement for such endeavors as physical therapy, occupational therapy, sports training, and other therapeutic and training uses. And may also be used to provide a human operator with increased sensory awareness as well as ease of use in teleoperated and telerobotic interactions with remote environments. For example, the PFFCs described herein may allow for more natural and intuitive control of the movement of a telemanipulator to allow a human operator to perform remote manipulative tasks more delicately and/or more quickly by feeding back remotely-sensed forces and, thereby, minimize undesired crushing or collisions by the remote manipulator.

As described more fully below, the PFFCs described herein provide an improved solution for applications such as the ones described above by providing for accurate tracking of an operator's movements, imparting high fidelity forces, being energy efficient, minimizing bulk, being lightweight, and being comfortable and ergonomic to allow long-duration use.

Example PFFC embodiments include modular PFFCs, which may provide the ability to successively add function and/or structure by adding physical modules and components. The modular PFFCs described herein include modules that may be attached to and removed from other modules, where each module may be adapted to be worn on a particular anatomical part of a human body. The modules may include structure to removably attach to or span an adjacent module, or a removable intermediate joining component for joining two modules. Such modularity provides for a PFFC system than may be rapidly and easily modified for a variety of different applications and use scenarios. For example, an open surgery simulation might be best served by a PFFC that only engages the wrist and the hand, while a device assembly simulation that includes virtual tools might require a PFFC to engage the hand, wrist, and forearm. As another example, it may be desirable to engage the hand, wrist, forearm, and elbow and/or shoulder of a human operator in a game or simulation to, for example, impart a more realistic sense of a virtual object's weight and provide higher fidelity control for complex movements such as throwing and catching. Such modularity provides significant benefits over certain prior art controllers, where customized exoskeletal controllers were designed for specific use scenarios. An operator would typically have to make due with a sub-optimal controller configurations for uses other than the specific one a controller was designed for since the development of customized controllers is a time consuming and expensive process.

In view of the broad applicability of the various aspects of the PFFCs described herein, FIG. 1 illustrates an exemplary modular exoskeleton PFFC system 100 that is designed and configured to be worn on an operator's arm. Example PFFC 100 has six modules, including shoulder module 110, upper arm module 112, elbow module 114, forearm module 116, wrist module 118, and grip module 120. Each of modules 110-120 may be removeably connected to an adjacent module, such that each module may be quickly and easily mechanically and electrically connected to the other modules. Each of modules 110-120 is a light-weight structure with comfortable and ergonomic features for attaching the module to a specific anatomical location, while also having appropriate structural integrity for a wide array of applications. Modules 110-120 may also have adjustment mechanisms for adjusting a size of PFFC 100 to the dimensions of a particular user.

One or more of modules 110-120 may have one or more degrees of freedom and be configured for movement relative to other modules so that PFFC 100 may follow the natural movements of a user's arm, and as described below, may impart forces in various directions and locations on the user. For example, elbow module 114 is configured to pivot about pivot point 122 such that first lateral member 124 may pivot relative to second lateral member 126 in the directions shown by arrow 1A. Forearm module 116 may be configured for torsional movement relative to wrist module 118 in the directions of arrow 1B. Similarly, wrist module 118 may be configured for torsional movement relative to one or both of forearm module 116 and grip module 120 in the direction of arrow 1C. In some embodiments, while modules 116 and 118 may be configured for relative torsional movement, PFFC 100 may have structural features that substantially prevent relative movement in other directions, for example, relative linear movement in the direction shown by arrow 1D, which can provide the structural integrity required for operation of the PFFC. Grip module 120 may be configured with one or more degrees of freedom to follow the natural movement of a user's hand relative to the user's wrist. Example grip module 120 has three degrees of freedom relative to wrist module 118, including pitch (wrist radial/ulnar deviation) in the direction of arrow 1E, yaw (wrist flexion/extension) in the direction of 1F, and linear axial movement in the direction of arrow 1G. As described below, the capability of linear axial movement in direction 1G may enable grip module 120 to be adapted to the size of a particular user's hand, and may also include the ability to impart haptic forces in the direction of arrow 1G.

A variety of position sensors may be utilized in PFFC 100 that may be designed to communicate a global and/or relative location of each module to a computer system. A variety of different location sensor solutions may be used, including inertial measurement components (IMUs), which may include one or more accelerometers, gyroscopes and/or magnetometers. PFFC 100 includes position sensor 128 in shoulder module 110, position sensors 130 and 132 in elbow module 114, and position sensors 134, 136, and 138 in forearm module 116, wrist module 118, and grip module 120, respectively. Each of position sensors 128-138 may provide high resolution location information describing the location of each module relative to other modules. In alternative embodiments, a rotational sensor, such as a rotary optical encoder may be used in addition to, or instead of, one or more of sensors 128-138 to provide information on a rotational position of one or more of the modules.

PFFC 100 may also include drive modules 140, 142, and 144 that are configured to impart forces on respective modules 114, 118, and 120. As will be described in more detail below, drive modules 140, 142, and 144 may include a component designed to impart a force on PFFC 100, such as a motor, shaped memory alloy, or ultrasonic actuator, and may also include corresponding structure for transferring the force to the structure of PFFC 100. Drive module 140 is coupled to elbow module 114 and is configured to impart a force on first and second lateral members 124 and 126, causing the elbow module to pivot in the directions of arrow 1A. Wrist module 18 may include drive module 142 which may be configured to impart forces on grip module 120 in one or more of the directions shown by arrows 1E-G, and grip module 120 may include drive module 144 that may be configured to impart a force in one or more of the directions shown by arrows 1E-G.

Thus, drive modules 140-44 are configured to provide a distributed array of highly precise and localized haptic sensations across the arm of a user, which may be used for a variety of applications.

Grip module 120 may have a variety of configurations, and may be highly adaptable so that PFFC 100 may be used for a variety of applications. For example, grip module 120 may include features for removeably mechanically and electrically connecting one or more controllers or implements to PFFC 100. For example, in a computer simulation application, grip module 120 may include logic that detects the type of grip connected to grip module 120 and make a corresponding update to the computer simulation. For example, when a model of a firearm is connected to grip module 120, corresponding software for controlling and providing haptic forces for a firearm may be activated. In a medical or telemanipulator application, the type of model implement connected to grip module 120 may invoke different libraries of geometric and force information such that a magnitude of movement and force of an implement at a remote location may vary for a given movement of the PFFC 100, depending on the implement coupled to the grip module.

Figure 2:
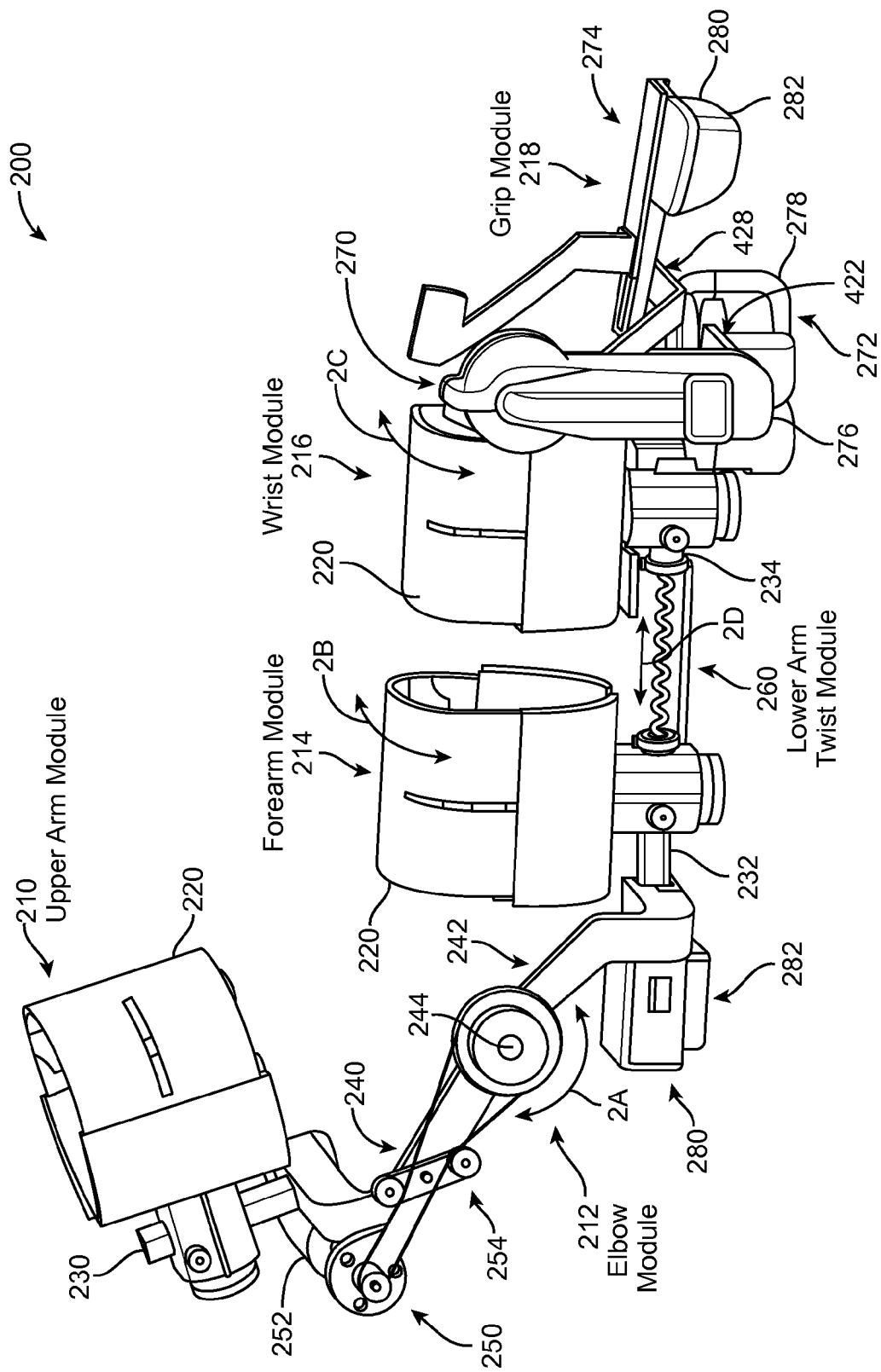
FIG. 2 illustrates another exemplary modular and portable force feedback controller.
Figure 3:
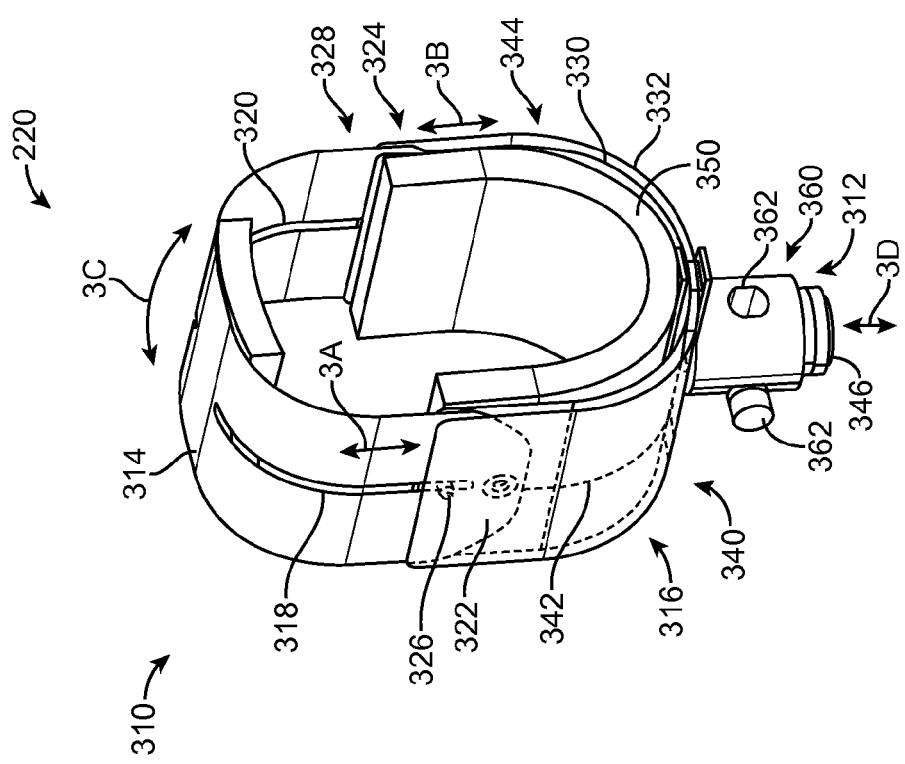
FIG. 3 is a perspective view of a limb attachment.

FIGS. 2-7 illustrate an example PFFC 200 that is designed and configured to be worn on a user's arm. Similar to PFFC 100, PFFC 200 includes upper arm module 210, elbow module 212, forearm module 214, wrist module 216, and grip module 218. Each of modules 210-218 includes limb attachment 220, which as described in more detail below in connection with FIG. 3, attaches each module to a respective location on a user's arm. In the illustrated embodiment, each of modules 210-218 utilize the same type of limb attachment 220, which is designed and configured to be adjustable to a wide range of sizes to that each limb attachment 220 may be securely coupled to any part of a user's arm. In other embodiments, the size of the limb attachment may vary between modules. Limb attachments 220 provide a light-weight and extremely comfortable attachment mechanism, which enables comfortable long-term use of PFFC 200. Each limb attachment 220 is slidably coupled to a respective elongate member, also referred to herein as receiver, 230, 232, 234 so that a position of each of limb attachment 220 may be adjusted to fit PFFC 200 to a particular user. Once positioned, limb attachments 220 may be fixed in place by tightening set screw 362 (FIG. 3).

Each of modules 210-218 are configured for relative movement with respect to the other modules, so that PFFC 200 may follow the natural movements of a user's arm and be configured to impart haptic forces on the user. For example, first and second lateral members 240, 242 of elbow module 212 may pivot about pivot point 244 in the directions of arrow 2A so that upper arm module 210 may move relative to forearm module 214 and permit a user to bend her arm. Elbow module 212 also has rotational drive component 250, which is configured to impart haptic forces on elbow module 212 and cause first and second lateral members 240 and 242 to move in the directions of arrow 2A. As described below in connection with FIG. 7, example rotational drive component 250 includes a motor 252 for generating forces and a belt and pulley system 254 for transferring the force from the motor to lateral members 240, 242. In the illustrated embodiment, motor 252 is a back-drivable DC motor.

Forearm module 214 and wrist module 216 are configured for relative torsional movement in the directions of arrows 2B and 2C to allow for a twisting motion along a section of a user's lower arm between elbow and wrist. In the illustrated embodiment, such relative torsional motion is enabled with lower arm twist module 260, which is designed and configured to allow relative torsional movement while substantially preventing axial movement in the directions of arrow 2D. As will be described in more detail in connection with FIG. 6, lower arm twist module 260 provides an elegant low-cost solution that enables a specific degree of freedom while limiting other degrees of freedom. As with grip module 120, grip module 218 has three degrees of freedom relative to wrist module 216, including pitch, yaw, and linear axial movement. In the illustrated embodiment, pitch and yaw are provided with two rotational drive components 270 and 272, respectively, and linear axial movement is provided with linear slide mechanism, also referred to herein as Z-slide 270, portions of which are further illustrated in FIGS. 4 and 5. As with rotational drive component 250 of elbow module 212, illustrated rotational drive components 270 and 272 include motor 410 (FIG. 4) and belt and pulley system 412 (FIG. 4), which are obscured from view in FIG. 2 by covers 276 and 278. Illustrated Z-slide provides linear movement and haptic force capability with linear drive component 280 (FIG. 5) which includes motor 510 (FIG. 5) and rack and pinion 512 (FIG. 5), which are obstructed from view in FIG. 2 by cover 282. In the illustrated embodiment, motors 410 and 510 are back-drivable DC motors.

PFFC 200 also includes an electronics box 280 that connects to one or more components of the PFFC and provides control function via a signal cable or wireless signal transmission interface. Electronics box 280 may include a rectifier and associated components for converting AC power to DC power as required by various components, and/or may include a battery pack. Alternatively, an electrical cable providing DC power may be connected to the electronics box. Electronics box 280 and/or other cables may interface with modules 210-218 via one or more junction boxes 282 or other interfaces that include various ports for receiving and/or transmitting signals to the various modules. Junction box 282, wrist module 216 and grip module 218 also include IMU position sensors (not shown) that are configured to collect various data relating to position, motion, speed, acceleration and/or other movement-related aspects of the structure.

FIG. 3 illustrates in greater detail limb attachment 220. As described above, in the illustrated embodiment, ease of manufacturing and cost reductions are realized by utilizing the same limb attachment 220 for attaching each of modules 220, 214, and 216 (FIG. 2) to a user's arm. In alternative embodiments, one or more of modules 220, 214, and 216 may have specific limb attachments with dimensions sized for a particular anatomical location. The design and configuration of limb attachment 220 is critical to the successful operation of PFFC 200, because PFFC 200 must be comfortable for a wide array of users, and must also firmly couple PFFC 200 to the user so that the haptic forces generated by the PFFC are felt at the appropriate anatomical location. For example, if an attachment structure is not properly designed such that it does not properly conform to a shape of a user's arm, the structure might be too loose, in which case a haptic force that is intended to be felt, for example, in a user's hand or elbow region, may instead be transferred along the structure of the controller and feel more like an uncomfortable tugging sensation on the user's skin where the attachment structure is located. Also, to adequately secure such a non-conformable limb attachment to a user, the limb attachment might need to be made uncomfortably tight, creating, for example, pinch points, which will prevent comfortable long-term use.

Limb attachment 220, by contrast, provides a light-weight and comfortable attachment mechanism for PFFC 200 (FIG. 2), which enables comfortable long-term use of the PFFC. Limb attachment 220 includes shell 310 coupled to base 312.

Shell 310 is comprised of upper portion 314 and lower portion 316, that are configured to wrap around and couple to a user's arm. Upper portion 314 is pivotally and slidably coupled to lower portion 316 which allows the shape of shell 310 to conform to a wide array of arm cross-sectional shapes, thereby resulting in a highly-conformable firm, yet comfortable fit. In the illustrated embodiment, upper portion 314 is pivotally and slidably coupled to lower portion 316 by incorporating slots 318, 320 in first and second ends 322, 324 of upper portion 314. Each of slots 318, 320 are sized and configured to slidably and pivitolly couple to pins 326, 328 (only one illustrated) such that first and second ends 322, 324 can independently slide in the direction of arrows 3A and 3B. Upper portion 314 is also configured to pivot about pins 326, 328 in the direction of arrow 3C to further enable adjustability.

Lower portion 316 has a double-walled design including an inner and outer walls 330 and 332, respectively, that are sized and configured for the sliding receipt of first and second ends 322, 324, of upper portion 314 therebetween. Such a double-walled configuration facilitates un-obstructed sliding engagement of upper portion 314 and lower portion 316 and ease of adjustability. Illustrated limb attachment 220 utilizes a line-and-spool attachment system 340 designed to slidably adjust the position of upper portion 314 and secure the upper portion to lower portion 316. Line-and-spool system 340 includes lines 342, 344 (only one illustrated), which are coupled to first and second ends 322, 324 and spool 346, which can be used to adjust the length of lines 342, 344 (only one illustrated) by rotating the spool, and secure the lines to base 312. In the illustrated embodiment, spool 346 is configured to release lines 342, 344 when it is pulled away from base 312 in the direction of arrow 3D and engages the lines when it is pushed into the base. Lines 342 and 344 may be tightened or loosened to thereby tighten or loosen shell 310 by rotating spool 346 either clockwise or counter clockwise. Illustrated spool 346 has a ratcheting mechanism such that after being tightened, it remains in place, thereby securing lines 342 and 344 and shell 310. Lines 342, 344 may be made from a variety of materials, including polymer fibers, such as a polyethylene fibers, such a spectra cable. The illustrated embodiment of shell 310 is constructed from high density polyethylene (HDPE), which provides appropriate flexibility and strength in a low-cost material. Alternative embodiments may be constructed from a variety of other materials such asnylon, polypropylene, and other durable and flexible plastics. .

Limb attachment 220 also has cushioning material 350 located on portions of an inner surface of shell 310. In the illustrated embodiment, cushioning material 350 is a viscoelastic foam, which has unique properties suitable for use in limb attachment 220. Specifically, cushioning material 350 has material properties that enable the cushioning material to comfortably conform to the shape of a user's arm, but also resist changes in shape when subjected to a sudden force, such as an impulse force, such as a force generated by PFFC 200. Such material properties aid in making limb attachment 220 comfortably yet firmly attach to a user's arm such that when haptic forces are generated by PFFC 200, the PFFC is firmly coupled to the user's arm and the forces are felt at the intended location, such as in the user's hand.

Limb attachment 220 also includes base 312. Base 312 is a substantially cylindrical protrusion designed to slidably couple with the PFFC 200 structure, such as elongate members 230, 232, 234 (FIG. 2) by sliding one of the elongate members into opening 360. Illustrated base 312 includes at least one flat 362 that mates with a respective flat in the PFFC structure 200 such as elongate members 230, 232, 234, to prevent rotation of limb attachment 220 relative to the elongate member. Base 312 also includes set screw 362 that allows quick and easy attachment of each limb attachment to the PFFC 200 by tightening the limb attachment on an elongate member.

Figure 4:
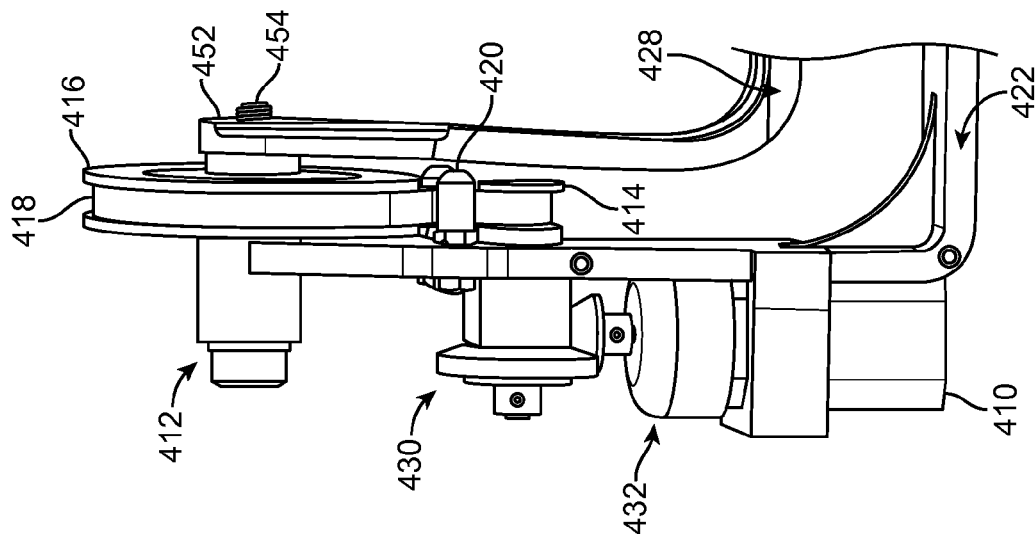
FIG. 4 illustrates a rotational drive module.

FIG. 4 illustrates rotational drive component 270 (FIG. 2), which enables pitch motion of grip module 218 (FIG. 2) relative to wrist module 216 (FIG. 2), and also provides haptic forces in the pitch direction. Rotational drive component 272 (FIG. 2), which enables yaw motion and generates haptic forces in the yaw direction, has a similar configuration as rotational drive component 270. Rotational drive component 270 includes motor 410, which, in the illustrated embodiment, is a back-drivable DC motor. Forces generated by motor 410 are transferred to the grip module 218 (FIG. 2) via a belt-and-pulley system 412, which includes drive pulley 414, driven pulley 416, belt 418, and a pair of tensioners 420. In the illustrated embodiment, belt 418 is a toothed belt. Rotational drive component 272 is grounded to PFFC 200 by structural member 422, which can also be seen in FIG. 2. Forces generated by rotational drive component 270 are transferred to grip module 281 by structural member 428 (also seen in FIGS. 2, 9, and 10), which couples to a proximal end of Z-slide 274 (FIG. 2). Thus, rotational drive components 270 and 272 are designed and configured with a highly reliable and powerful design in a compact space envelope by incorporating two L-shaped structural members (422 and 428), that provide two degrees of freedom for grip module 218 with a single point of contact to wrist module 216 where structural member 422 couples to rotational drive component 272. In addition, member 428 is also configured with a forward-offset such that a distal end 1050 (FIG. 10) of member 428 is distal of a proximal end 452 (FIG. 4) of the member, such that pitch rotation point 454 (FIG. 4) may be adjacent the natural location of pitch rotation in a user's wrist, while proximal end 1056 (FIG. 10) of Z-slide 274, which couples to distal end 1050 (FIG. 10) of member 428 is sufficiently distal to align a grip, such as grip 1000 (FIG. 10) with the user's palm. Such a configuration allows more natural movement of grip module 218, particularly in the pitch direction, and enables a more compact Z-slide 274 design, since proximal end 1056 of Z-slide may be located closer to the location of the user's palm.

To facilitate a compact design, motor 410 is arranged in a parallel relationship with the plane of movement the motor is configured to impart forces in. For example, motor 410 is coupled to PFFC structure 422 in a substantially vertical configuration and causes grip module 218 (FIG. 2) to move in the pitch direction, or in a vertical plane. A pair of bevel gears 430 enables such a compact arrangement. Rotational drive component 272 also includes rotational position sensor 432, which is mounted in the housing of motor 410, which may be used to generate a signal representative of a position of grip module 218, which may be used, for example, by the PFFC control system described below. In the illustrated embodiment, rotational position sensor 432 is a rotary optical encoder. Thus, rotational drive components 272 and 270 have a compact, low cost, and reliable design and are configured to provide grip module 218 (FIG. 2) with two degrees of freedom and two degrees of torque feed-back capability.

Figure 5:
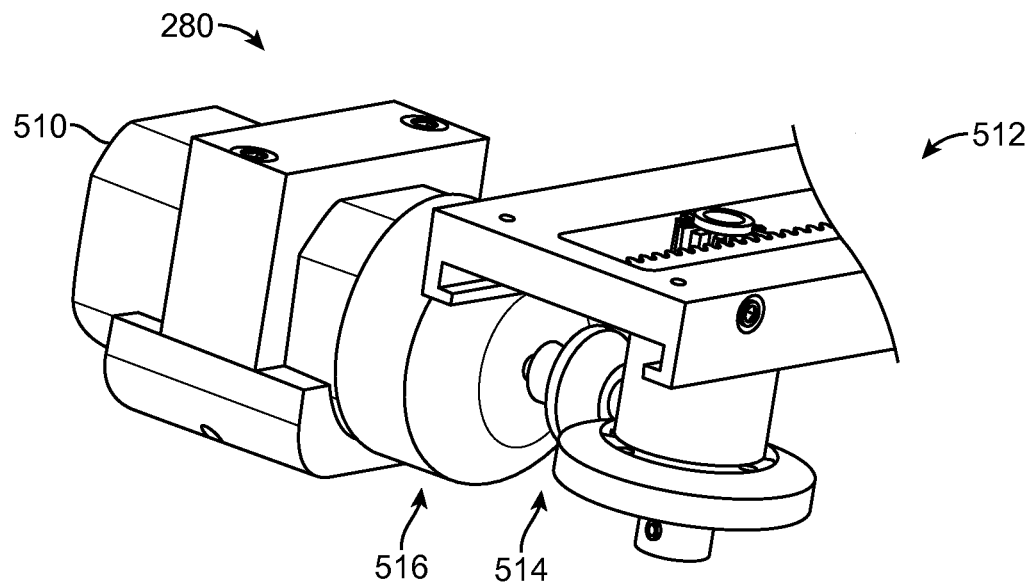
FIG. 5 is a perspective view of a linear drive component.

FIG. 5 illustrates a portion of linear drive component 500 of Z-slide 274 (FIG. 2). As described above, Z-slide 274 is configured to provide an axial linear degree of freedom to grip module 218 (FIG. 2) and is also configured to provide haptic forces in that same direction. Z-slide 274 uniquely allows grip module 218 to automatically accommodate different length hands, and allows sensing of a position of a grip coupled to grip module 218, as well as forces imparted on a user's hand. Z-slide 274 includes motor 510, which, in the illustrated embodiment, is a back-drivable DC motor. Forces generated by motor 510 are transferred to the grip module 218 (FIG. 2) via a rack-and-pinion system 512. As with rotational drive components 270, 272, Z-slide 274 utilizes a pair of bevel gears 514 to provide a compact yet reliable design, by allowing motor 510 to be parallel with Z-slide 274. Z-slide 274 can thus provide a haptic force in an axial direction which, as described below, can be utilized in a variety of applications to enhance the force-feedback capabilities of PFFC 200. Z-slide 274 also includes rotational position sensor 516 mounted on motor 510, which in the illustrated embodiment, is a rotary optical encoder. In alterative embodiments, Z-slide position information may be obtained with alternative rotation sensors, and/or with a linear position sensor coupled to rack-and-pinion 512. Alternative embodiments of PFFCs may include a Z-slide that does not have any sensory, display, or actuation capabilities, that is primarily configured to allow grip module 218, through passive motion, to automatically adjust to different user hand sizes. In yet other embodiments, grips without a Z-slide may be directly incorporated into wrist module 216 (FIG. 2).

Figure 6:
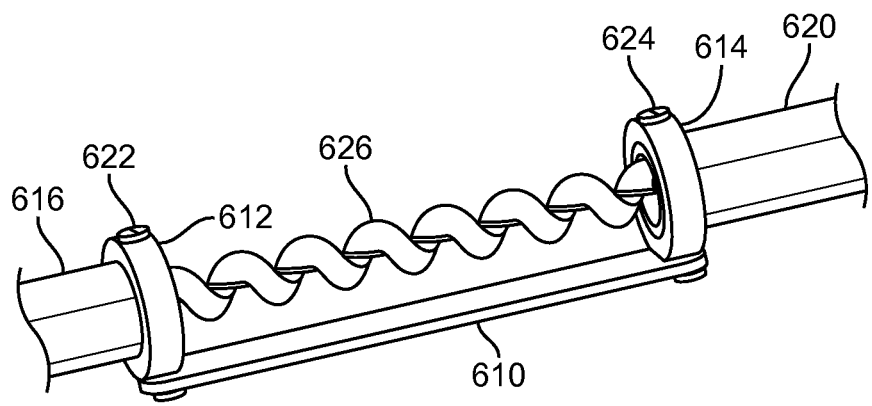
FIG. 6 is a perspective view of a lower arm twist module.

FIG. 6 illustrates lower arm twist module 260 (FIG. 2). As described above, lower arm twist module 260 enables a specific degree of freedom while limiting other degrees of freedom. Specifically, lower arm twist module 260 allows relative torsional movement between forearm module 214 and wrist module 216, while substantially preventing relative axial movement, so that axial forces may be transferred between the forearm and wrist modules and the forearm module is prevented from sliding down the user's arm. Lower arm twist module 260 includes elastomeric element 610 extending between connector rings 612, 614, which are coupled to tubes 616, 620, by set screws 622, 624. In the illustrated embodiment, elastomeric element 610 is made from HDPE. This arrangement provides considerable freedom of movement in rotation/twist between the user's wrist and forearm yet has sufficient along arm stiffness to transfer forces along PFFC 200. Tubes 616 and 620 provide a dual purpose of a structural member as well as a conduit for wiring 626 routed between wrist module 216 and forearm module 214.

Figure 7:
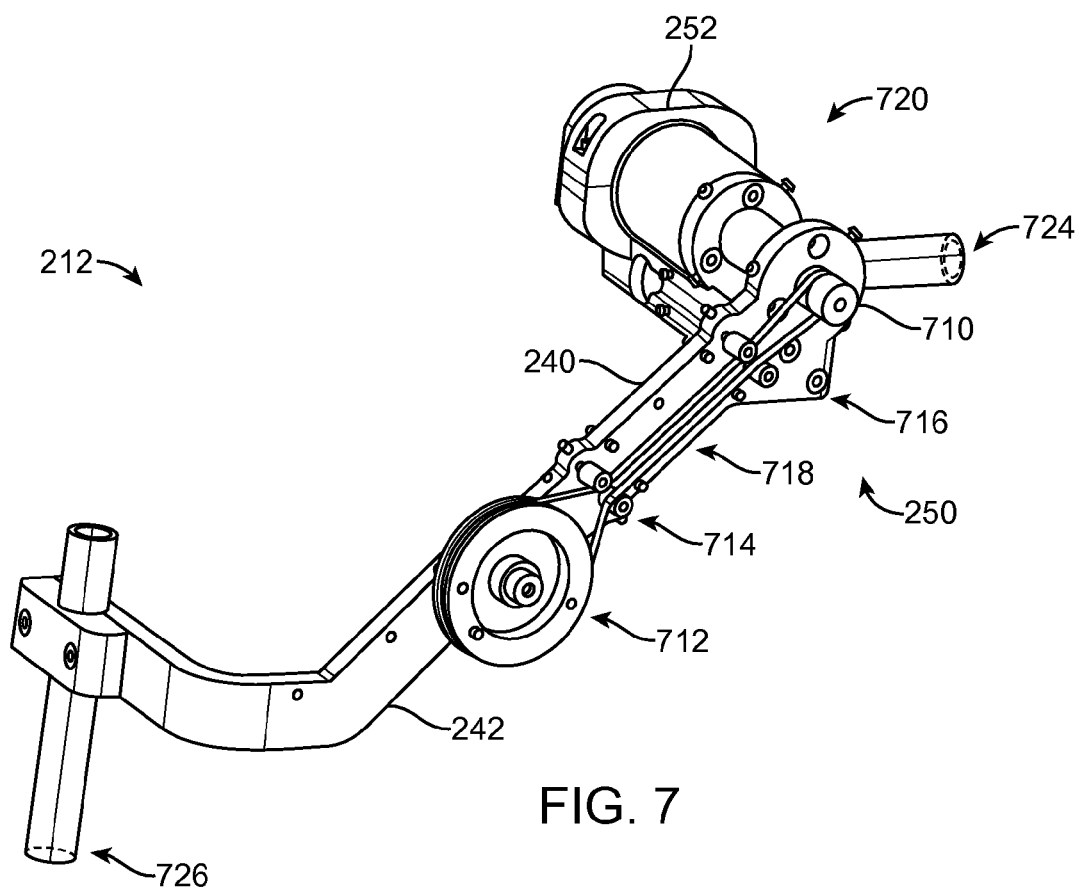
FIG. 7 illustrates an elbow module.

FIG. 7 further illustrates elbow module 212 (FIG. 2). Elbow module 212 is configured to allow PFFC 200 to follow the natural movement of a user's arm by allowing first lateral member 240 and second lateral member 242 to pivot about pivot point 244. Elbow module 212 also includes drive component 250, which is configured to impart a force on first lateral component 240 and second lateral component 242 at pivot point 2244. Drive component 250 includes motor 252 and belt-and-pulley system 254. In the illustrated embodiment, motor 252 is a back-drivable DC motor. Belt and pulley system 254 includes drive pulley 710, driven pulley 712, two pairs of tensioners 714, 716 and toothed belt 718. Alternative actuation devices may include shaped memory alloys and ultrasonic actuators. Elbow module 212 also includes features to sense the user's elbow angle, such as a rotational position sensor, such as a rotary optical encoder 720, located on motor 252, or other sensors to detect position, rotation and force data at the user's elbow joint. Additional or alternative sensors may include potentiometers or other variable resistance elements and/or IMUs such as accelerometers, gyroscopes, and/or magnetometers attached to forearm module 214.

Elbow module 212 also includes receivers 724, 726 that are sized, positioned, and otherwise configured to support and/or connect to forearm module 214 and upper arm module 210 and to allow the modules to be adjusted to accommodate different arm sizes. Elbow module 212 may also include a variable resistance element that actuates pressure against frictional brake pads to change resistance to motion based on various input factors. Other variations include structures that provide electromagnetic resistance to movement between two magnetic plates, or structures that provide resistance to movement as controlled by hydraulic or air being forced through an electrically or mechanically controlled flow valve.

Figure 8:
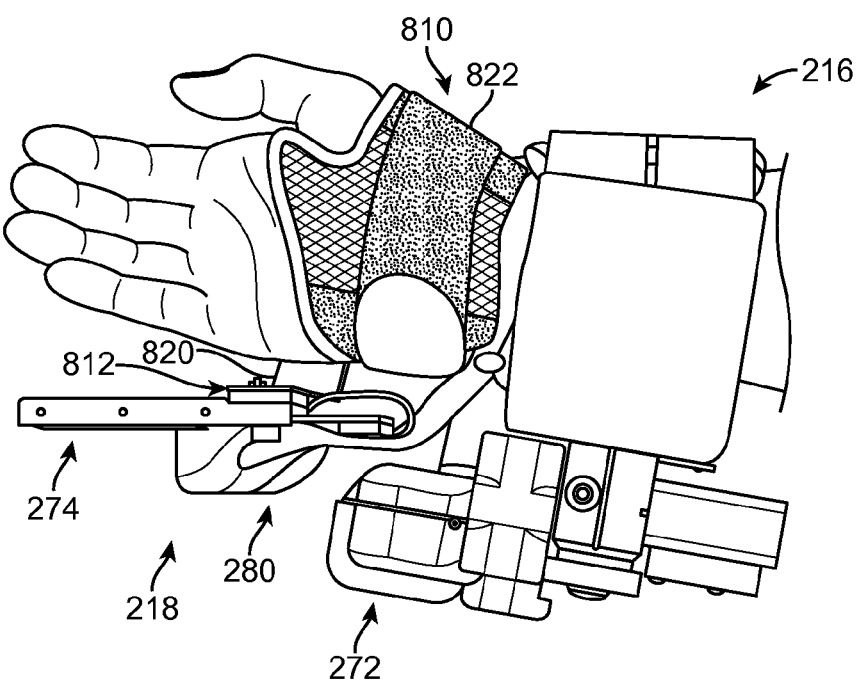
FIG. 8 illustrates an example wrist module and grip module in use.

FIG. 8 illustrates grip module 218 and wrist module 216 (FIG. 2) with an example grip 810 removably coupled thereto. As described above, grip module 218 includes rotational drive components 270, 272 (only one is illustrated in FIG. 8) and Z-slide 274. A position of grip module 218 may be determined from rotary optical encoders located on the motors in rotational drive components and linear drive component 270, 272, 280, or may be determined in other ways, such as with the addition of an IMU sensor to grip module 218. Grip module 218 also includes grip attachment 812 that is designed to removeably couple example grip 810 to Z-slide 274. Grip attachment 812 is configured to mechanically and electrically connect a variety of grips such as grip 810 easily and quickly to grip module 218 so that a user can easily interchange grips during use. In the illustrated embodiment, grip attachment 812 is configured to form an electrical connection with a grip via a printed circuit board (PCB) electrical connector and a conductive elastomeric element including a foam member and conductive elements located in the foam member. The conductive elastomeric element is configured to be positioned between the grip attachment 812 PCB and a PCB located in a grip to thereby form an electrical connection. Example grip 810 includes a dexterous handle structure 820 mounted to Z-slide 274. As shown, Z-slide 274 and grip 810 are positioned distal of a user's wrist, and distal of rotational drive components 270, 272 (only one is illustrated in FIG. 8). In use, dexterous handle structure 820 may be attached to a user's hand across the user's palm region using an attachment structure such as glove like fabric structure 822 and adjusted using straps. Example grip 810 allows a user to pick up and manipulate objects while wearing PFFC 200. Other embodiments of grips that may be coupled to grip module 218 include any structure for mechanically coupling the grip module to a user's hand, including structures that are not designed to be gripped by the user's hand, such as dexterous handle structure 820, which is designed to be adjacent the back of the user's hand, as shown in FIG. 8.

Figure 9:
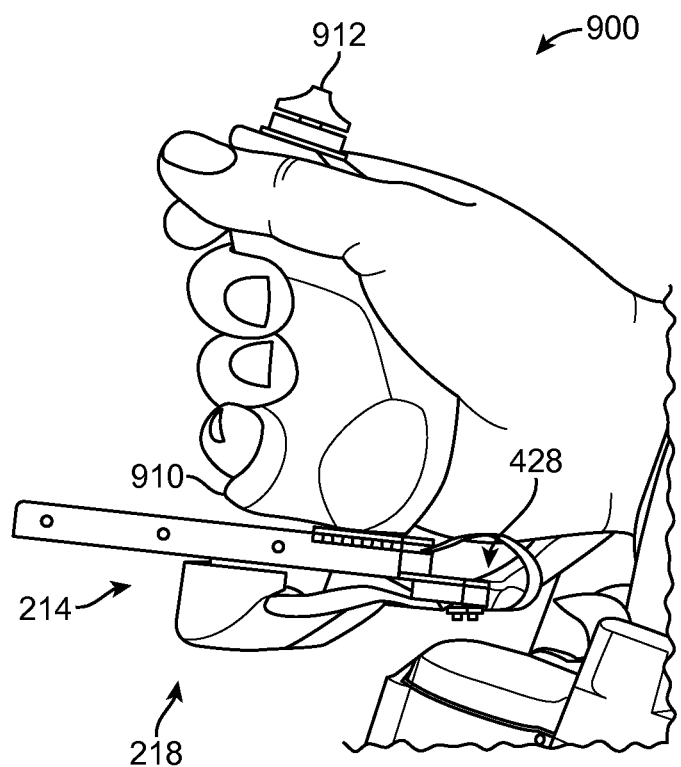
FIG. 9 illustrates a grip in the form of an ergonomic handle coupled to a grip module in use.
Figure 10:
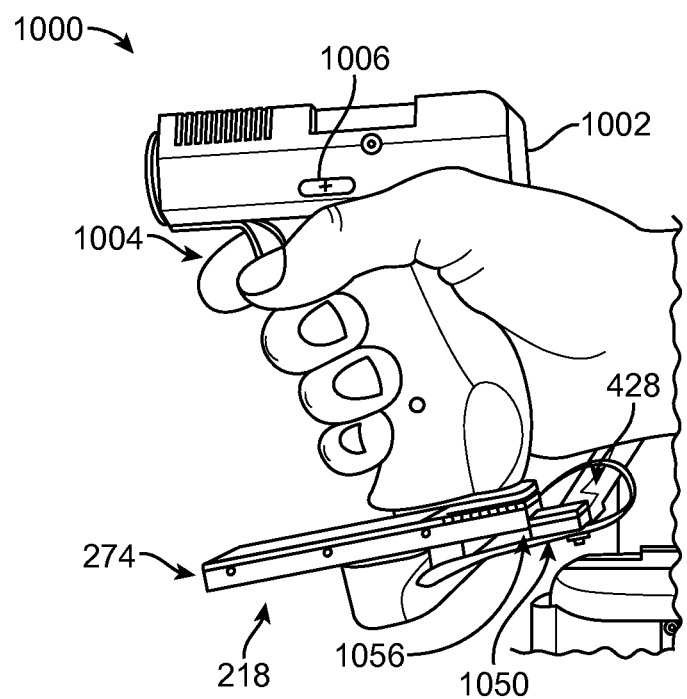
FIG. 10 illustrates a grip in the form of a pistol handle coupled to a grip module in use.

FIGS. 9 and 10 illustrate alternative grips 900 and 1000 which may be removeably coupled to grip module 218. Grip module 218 and Z-slide 274 can accommodate various active (e.g., with various sensory, display and actuation capabilities) or passive grips. Grip 900 (FIG. 9) includes a control stick-like ergonomic handle 910 coupled to Z-slide 274. Handle 910 may include a 4 position hat switch 912 configured to provide input for PFFC applications, as well as an infrared proximity sensor (not illustrated) to detect when a user is holding the handle. Possible applications for grip 900 include vehicular control and flying simulations. Grip 1000 (FIG. 10) includes a pistol handle 1002 coupled to Z-slide 274. Pistol handle 1002 may include a trigger-actuated switch 1004 as well as any number of configuration buttons, such as button 1006 along the side of grip 1000. Grip 1000 may be used, for example, for weapons training simulations as well as games. In the illustrated embodiment, Z-slide 274 may provide haptic force feedback capability specific to grip 1000, such as a recoil force when the gun is fired. In one embodiment, pistol handle 1002 also has an internal solenoid (not illustrated) which may add additional haptic realism to firing a virtual pistol by providing additional impulsive reaction forces in addition to those generated by Z-slide 274.

Figure 11:
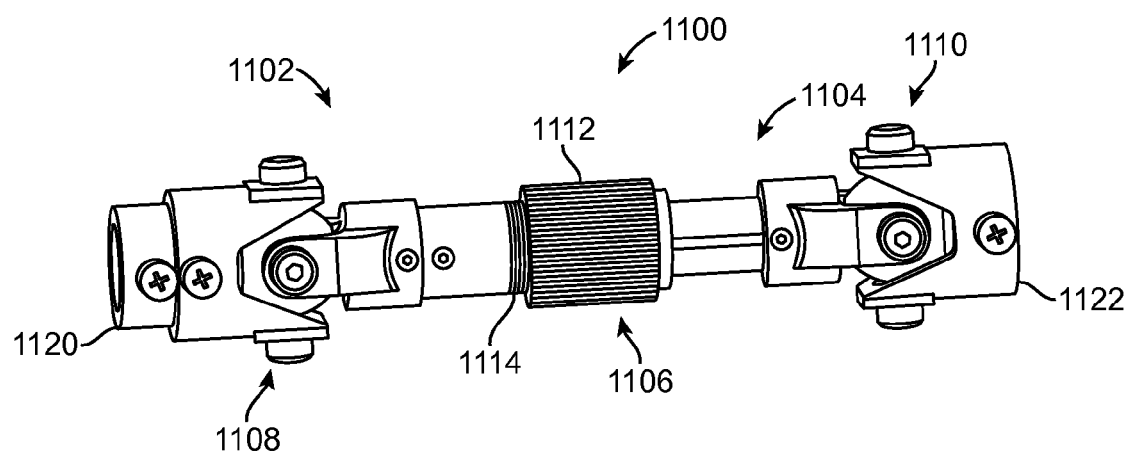
FIG. 11 illustrates an exemplary lower arm twist module.
Figure 12:
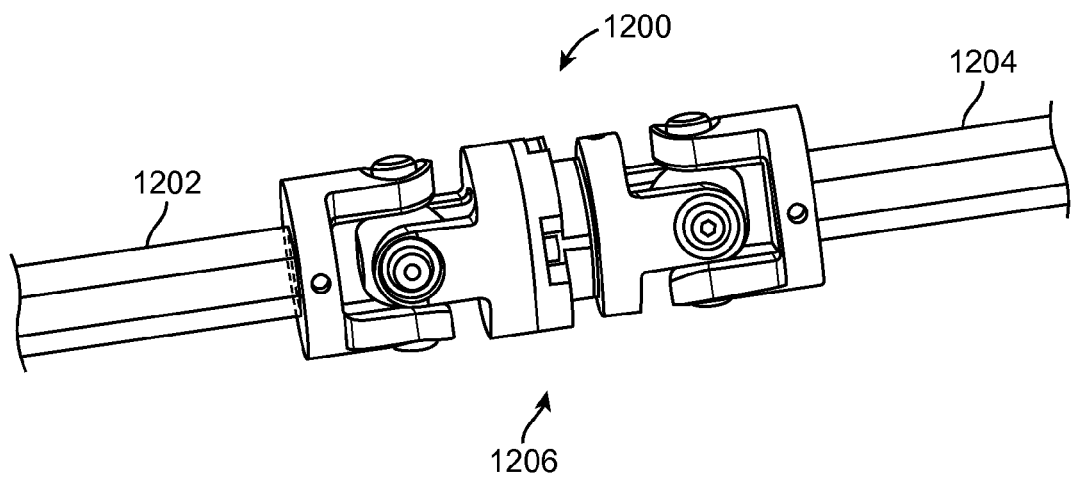
FIG. 12 illustrates another example of a lower arm twist module.

FIGS. 11 and 12 illustrate alternative embodiments of twist modules that may be used to allow relative torsional motion between adjacent modules. For example, either twist module 1100 or twist module 1200 may be used instead of lower arm twist module 260 (FIGS. 2 and 6). Twist Module 1100 includes two lateral arm members 1102, 1104 joining a telescoping structure 1106 and joints 1108 and 1110 that allow relative movement between adjacent modules. An overall length of twist module 1100 may be adjusted to, for example, conform to the length of a user's arm, by rotating threaded outer shaft 1112 of telescoping section 1106 relative to threaded inner shaft 1114. Electrical cables may be routed through an inner lumen of tubing 1120 and 1122. Twist module 1200 (FIG. 12) includes first arm member 1202 and second arm member 1204 joined at joint 1206, which allows relative rotational motion as well as angular motion, but substantially prevents axial motion. Joint 1200 may include a high resolution rotational optical encoder that can be used to provide high-resolution sensing of twist of the operator's lower arm.

Figure 13:
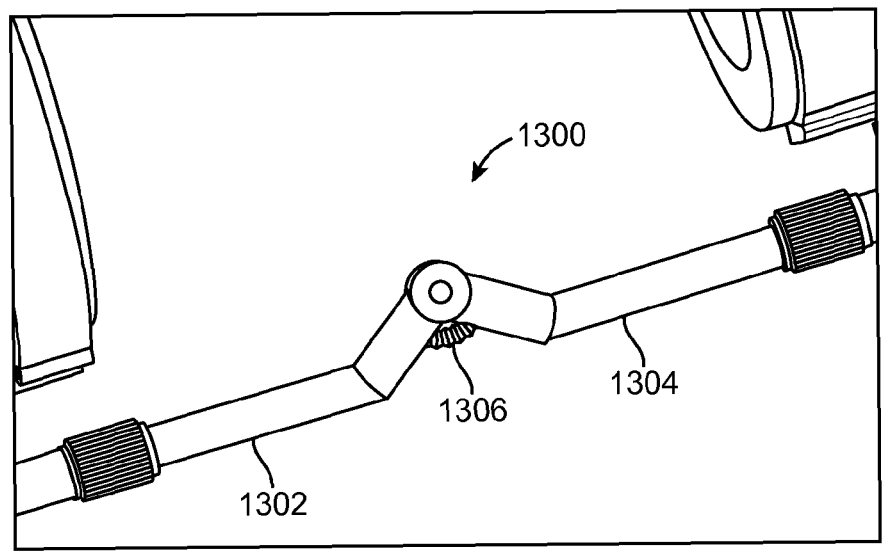
FIG. 13 illustrates an elbow module with a multicentric hinge.

FIG. 13 illustrates an alternative hinge mechanism 1300 that may be used in an elbow module, such as elbow module 212. Hinge 1300 includes first and second lateral members 1302, 1304 pivotally coupled by multi-centric hinge 1306. Multi-centric hinge 1306 is a geared mechanism that may provide a ratio of angular movement between first and second lateral members 1302, 1304 of 1:1 or a ratio other than 1:1. For example, for a given amount of angular movement of first lateral member 1302 about multi-centric hinge 1306, second lateral member 1304 may move a different amount. Such a relationship may be used to provide an elbow module that more-closely follows the natural movement of a user's arm, which may prevent unwanted relative axial movement between a limb attachment and a user's arm.

Figure 14:
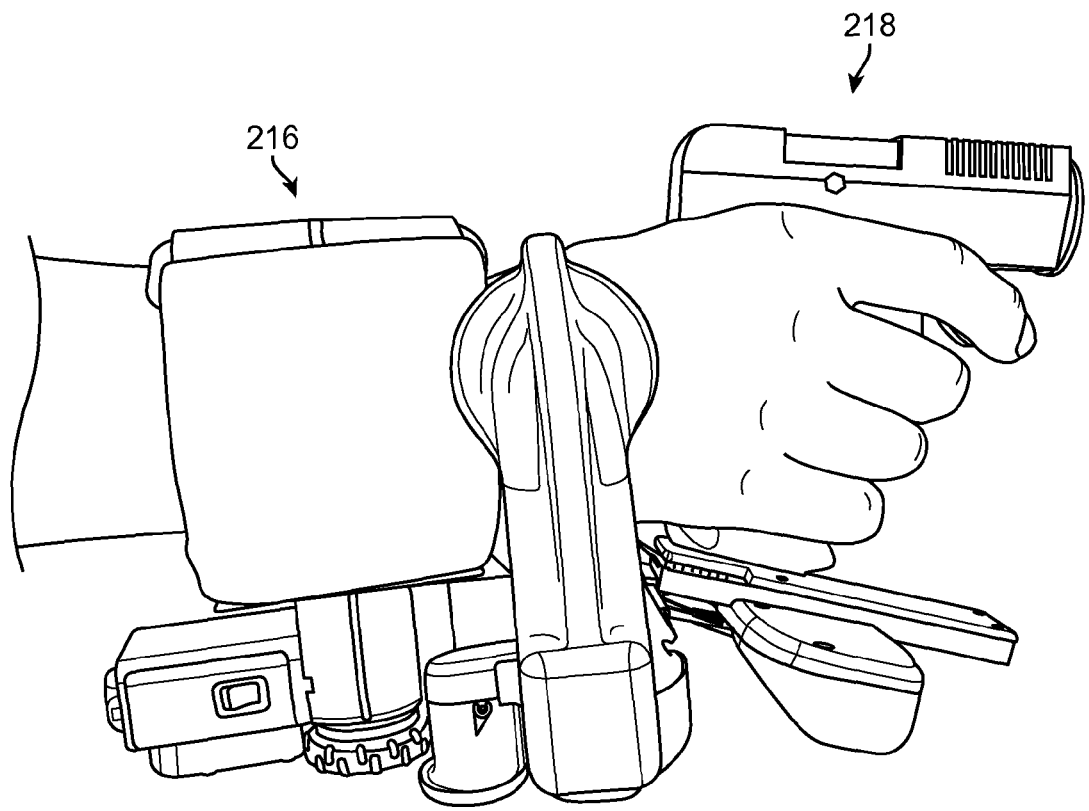
FIG. 14 illustrates a grip and wrist module configuration.
Figure 15:
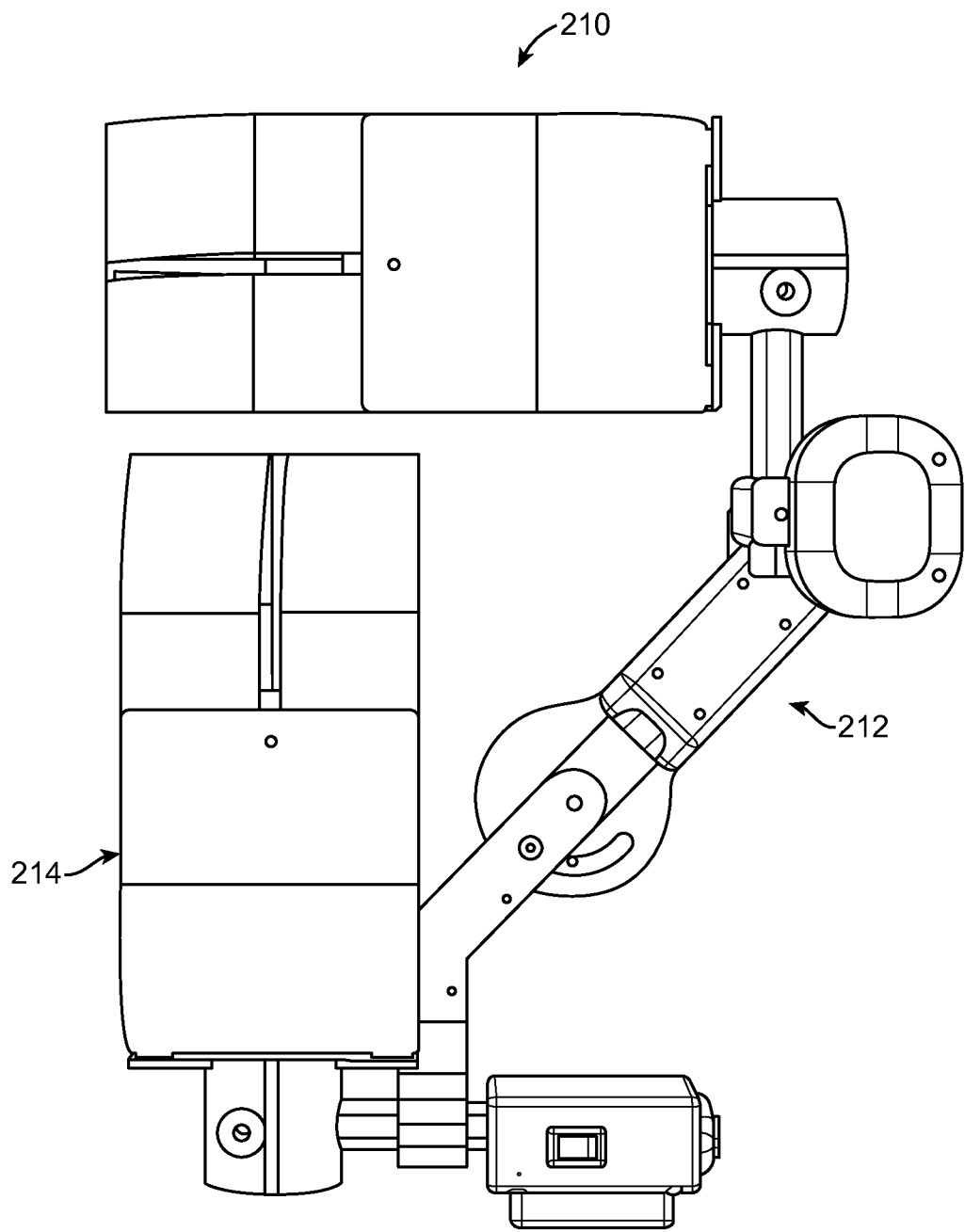
FIG. 15 illustrates a forearm, elbow, and upper arm module configuration.

As described above, example embodiments of PFFCs include modular PFFCs, where the PFFC is comprised of interchangeable modules that may be easily connected and removed for different applications. Thus, subsets of modules may be used specialized purposes. For example, subsets of available PFFC modules may be used for specific purposes. This allows PFFCs to be optimally reconfigured for required function. Example embodiments support this configurability through the use of standardized mechanical mating features as well as electrical data and power connectors. For example, in one embodiment, ½" (or other sized) aluminum tubes or other wire delivery structures with dual flats may be used extensively in the structure of a PFFC and its modules. Modules can be easily attached to these tubes or other wire delivery structures with an appropriate mating component (such as a pin-and-receptacle) and can be affixed to the structure with a set-screw, or left to slide along the structure as appropriate. In one embodiment, circular, push-pull, self-latching, quick-disconnect connectors may be used to allow data and power connections between modules to be quickly established or broken for reconfiguration. FIGS. 14 and 15 illustrate the capacity of PFFCs, such as PFFC 200 for modularity. For example, FIG. 14 illustrates how wrist module 216 and grip module 218 may be used independently of other modules, which may provide a highly-portable controller for weapons training or gaming. FIG. 15 illustrates another example, where forearm module 214, elbow module 212, and upper arm module 210 may be used independently of other modules for various applications, such as elbow exercise or physical therapy.

Figure 16:
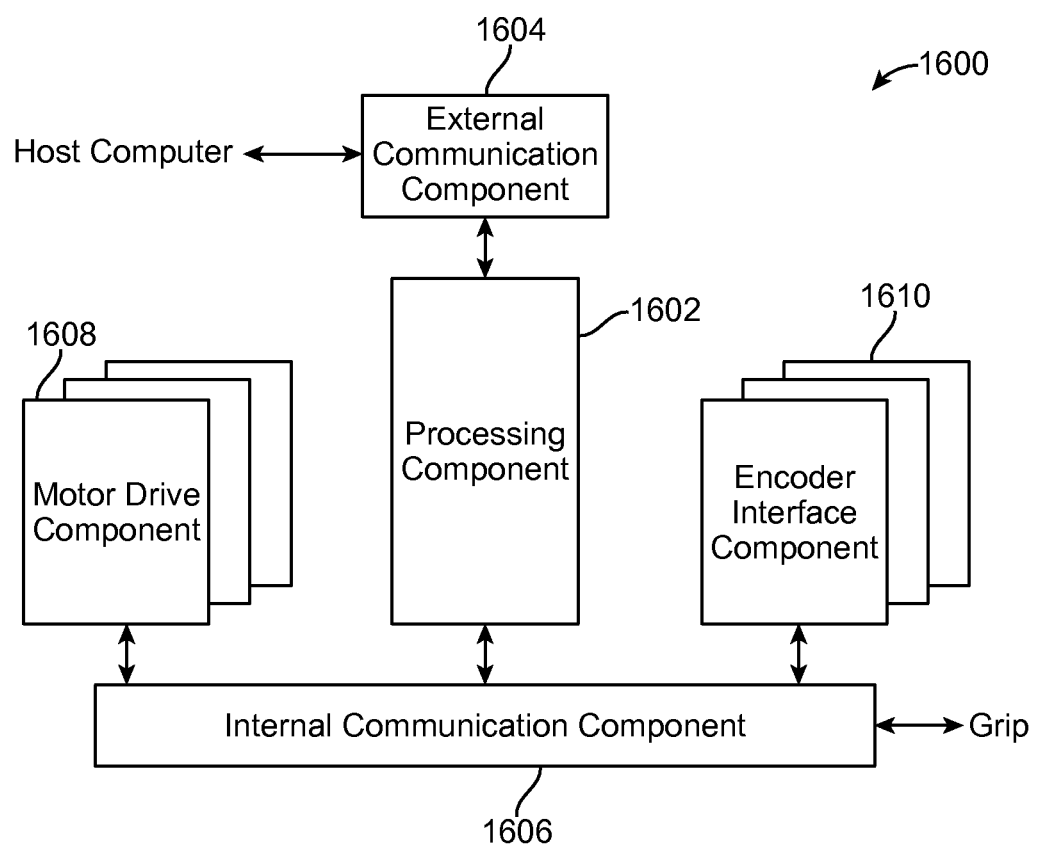
FIG. 16 is a block diagram of an example force feedback controller system architecture.
Figure 17:
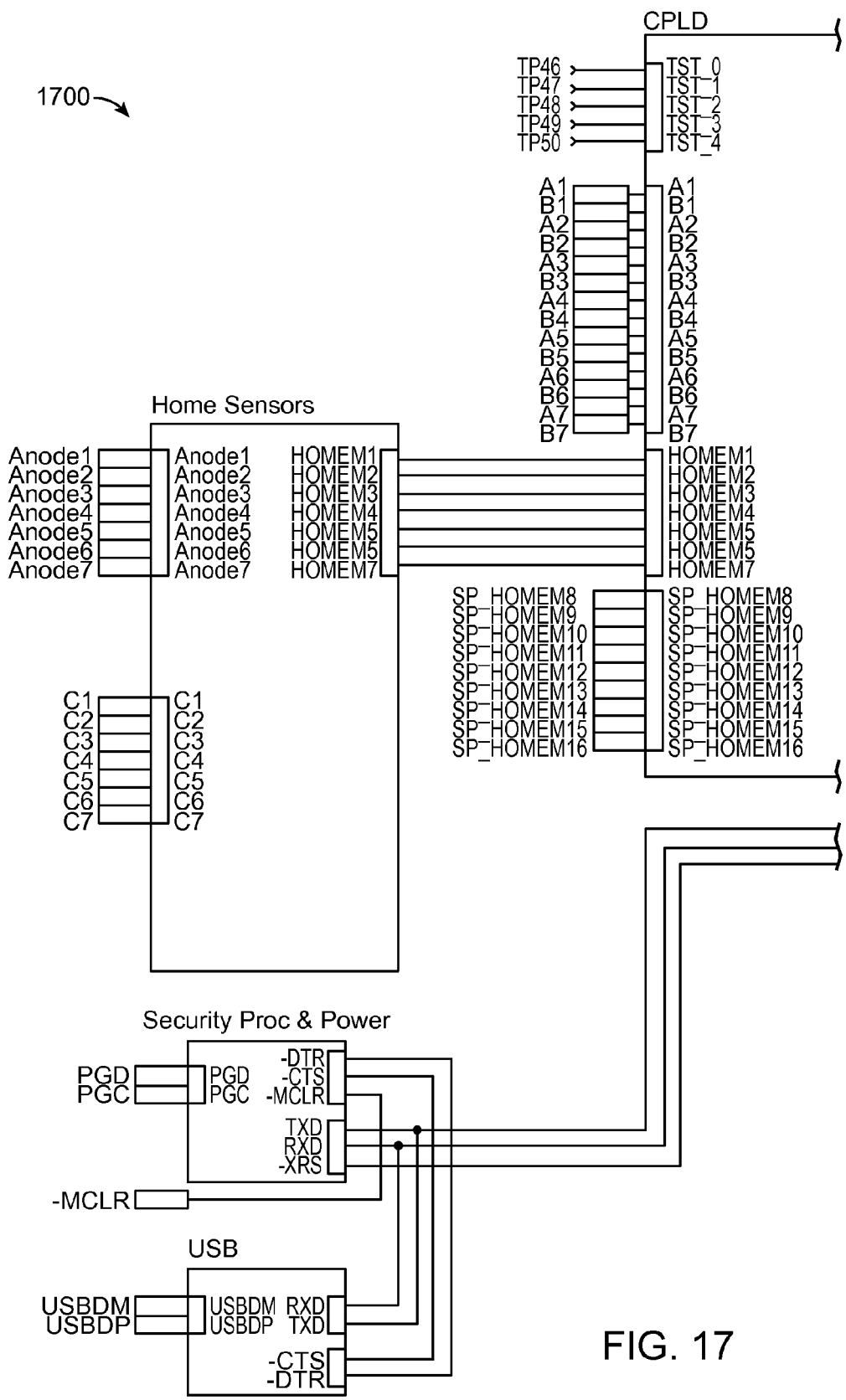
FIG. 17 is an example implementation of the system architecture of FIG. 16.
Figure 17:
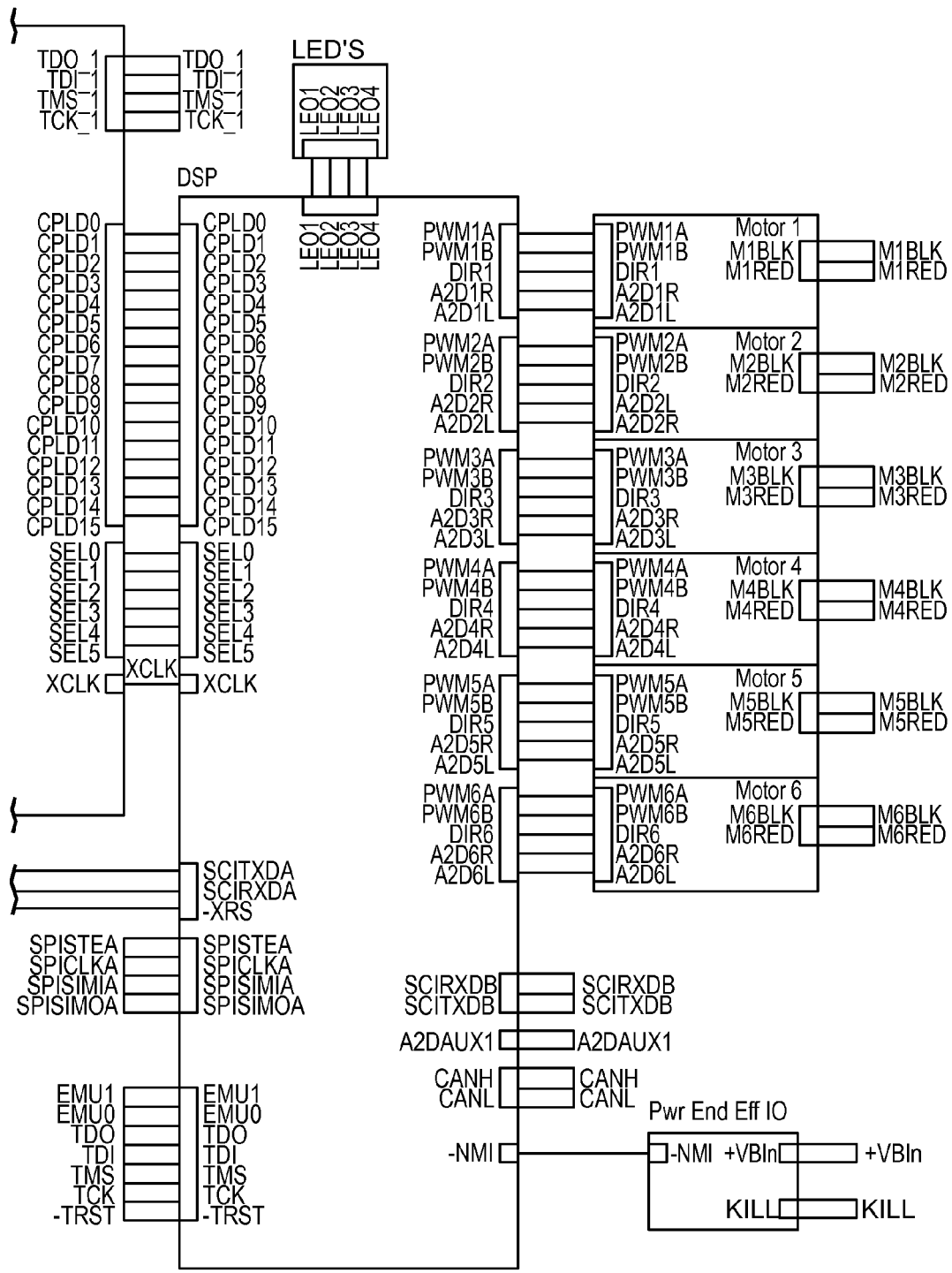
Figure 18:
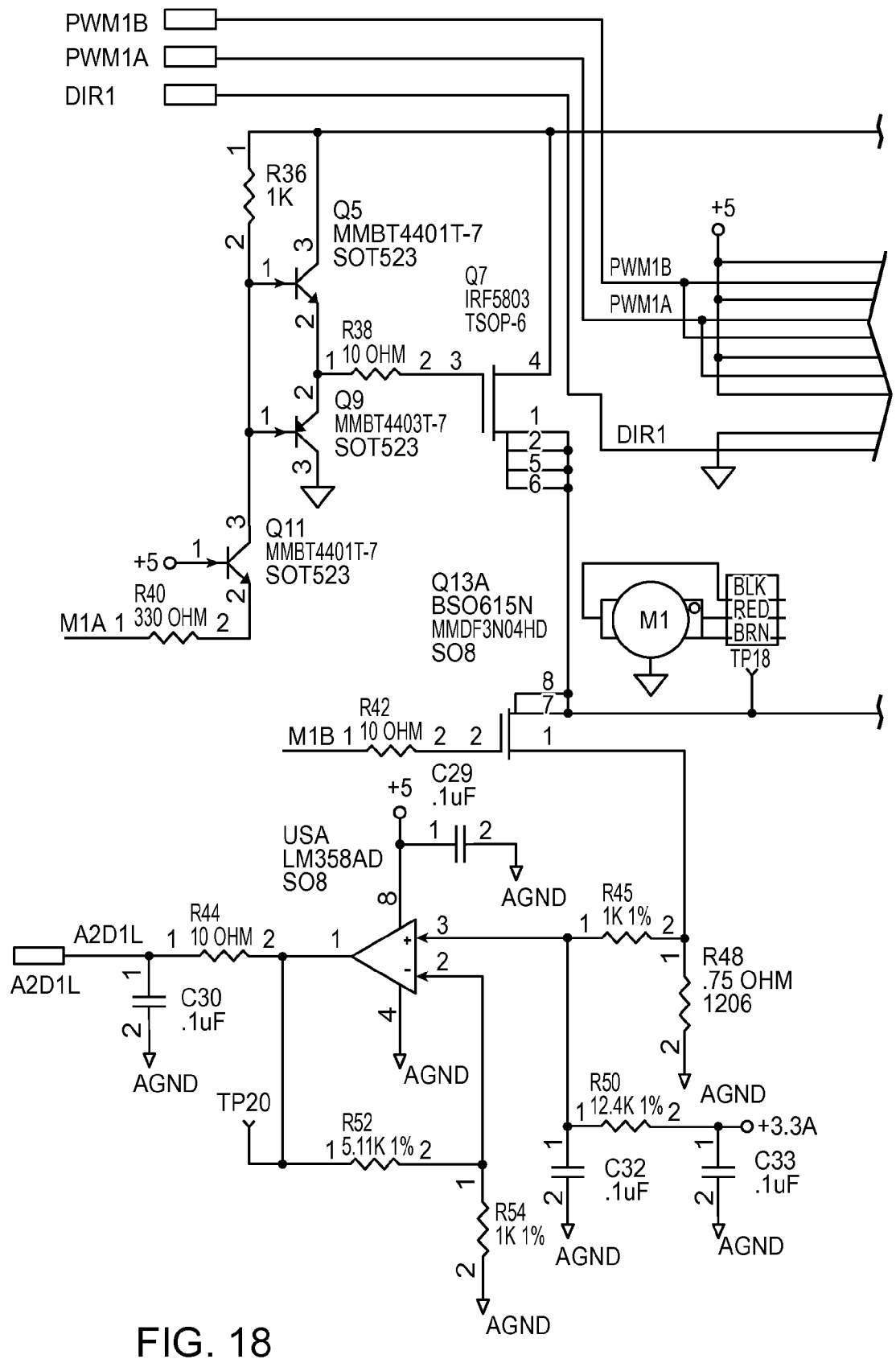
FIG. 18 is a circuit diagram of an example of a motor drive component.
Figure 18:
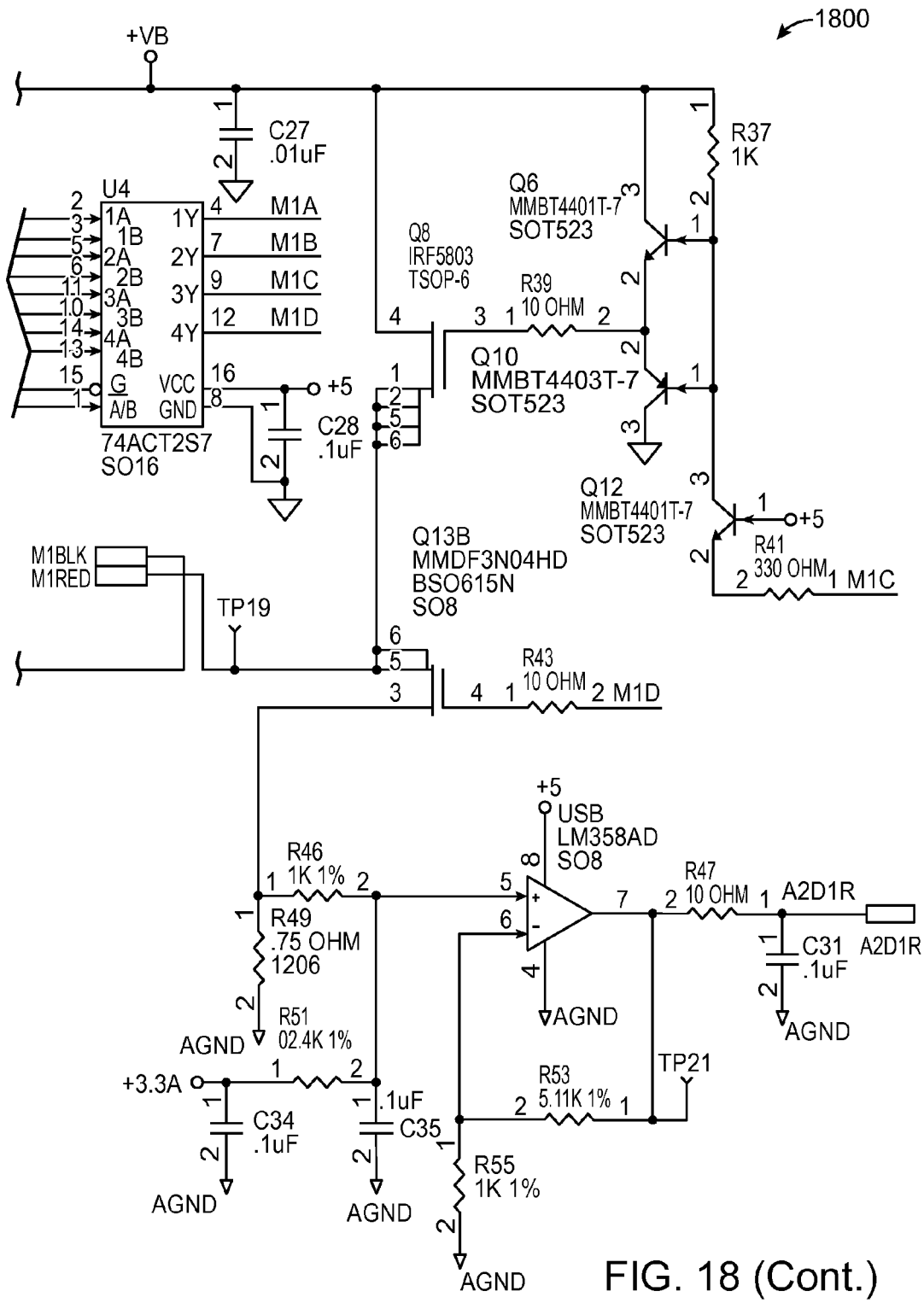

FIGS. 16-18 illustrate example computer and electrical system architectures that may be utilized with various PFFC embodiments. Example system architecture 1600 includes processing component 1602 which may include one or more processors, external communication component 1604, internal communication component 1606, motor drive components 1608 and encoder interface components 1610. External communication component 1604 may be a transmitter, receiver, transceiver, communicational port, or other communication device configured to handle communication between PFFC electronics and an on-board or remote host computer. Various wired and wireless communication protocols may be handled by external communication component 1604. Internal communication component 1606 may handle data communication between modules and components of the PFFC, such as communicating with a grip attached to a grip module.

Motor drive components 1608 may include an encoder or drive configured to allow processing component 1602 to control a torque on one or more motors. For example, control may include using two pulse width modulated (PWM) control signals and a direction signal. Analog signals, directly proportional to the current used by the DC motor, may be provided to the processing component 1602 so that torque control can be effected for a motor. A variety of motors may be operated by motor drive components 1608. Any module may include a motor and motor drive component. Motor drive components 1608 for any module may drive the respective module's motor and thus provide a user with force feedback. Additional sensing abilities and optional braking resistance or torque motor actuation structures can be included with any of the modules and/or their components.

Encoder interface components 1610 may receive and/or process linear and rotational sensor information from any module's drive component, such as that provided in quadrature format. The encoder interface components 1610 may handle fundamental interfacing with a sensor and may implement, as applicable, an encoder "tick" counter in hardware. Processing component 1602 may be read and reset the counter. The number of motors, motor drive components 1608 and encoder interface components 1610 may vary based on the specific configuration of the PFFC.

FIG. 17 illustrates an example application 1700 of architecture 1600, which shows how the electronic architecture of a PFFC may be designed as a modular system to facilitate the modularity of modular PFFCs. The electronic components may be designed so that they co-reside on a single printed circuit board, or they may be distributed across multiple printed circuit boards for modularity and/or packaging considerations. For example, a module may contain a unique circuit board, or it may share a circuit board with one or more other modules or components. In one embodiment, shown in FIG. 17, PFFC electronics are hosted on a single printed circuit board assembly. The illustrated embodiment includes a processing component (corresponding to processing component 1602) in the form of a high performance digital signal processor, seven encoder interfaces (corresponding to encoder interface components 1610), which may be implemented as shown using a complex programmable logic device (CPLD), and six motor drive components (corresponding to motor drive components 1608). The external communications component (corresponding to external communications component 1606) may include a wired USB 2.0 and/or communication protocol. The internal communication component (corresponding to internal communications component 1606) may include bi-directional serial communication, a quadrature interface for a single encoder, motor drive signals for a single DC motor and power supply DC power to the Grip Bus.

FIG. 18 illustrates an example motor drive component 1800 (corresponding to motor drive component 1608). PFFC electronics may be powered by a DC power source, for example, an AC adapter with transformer or a battery. In one embodiment, PFFC electronics can be powered by a 12V-30V DC power source. In one embodiment, they may be powered by a 22V, 2.5 amp DC power source. In another embodiment, the PFFC electronics may be powered by a 14.8V, 800 mAh lithium polymer battery.

In addition, the MPEFFC Electronics may be designed so that only passive cooling is required in typical consumer, laboratory and industrial environments (i.e., 5-38 degrees Celsius).

The PFFCs described herein may sense body position and apply a tactile stimulus to one or more parts of the body (such as by applying resistance to movement, haptic motor force, vibration via a motor, ultrasonic vibration, or heat or cold if heating or cooling elements are included in any module), and/or a non-tactile stimulus (which could mean one or more of: visual display, sound, scent). The PFFC modules can attach to one another, and operate in sequence with each other, or operate independently of each other, which may allow a user to purchase the various exoskeleton attachments together or separately.

The PFFCs described herein may be controlled by a remote computer, an onboard computer, and/or a portable electronic device such as a smart phone or tablet. Whether the system is independent as a console or on a table, within a backpack, included as part of an exoskeleton, or a portable electronic device, in various embodiments it can be hardwired to the PFFC or can have a wireless connection to the PFFC. This communication can then allow the computers to read the position or other sensors, and then apply tactile or non-tactile stimuli through the PFFC or add-on attachments.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A force feedback controller comprising:
a wrist module, said wrist module including a first limb attachment configured to couple said force feedback controller to the user's arm; and
a grip module coupled to said wrist module, said grip module being moveable in a first and second direction relative to said wrist module, said first direction being substantially perpendicular to said second direction, said grip module including:
a linear slide mechanism having a grip attachment, said grip attachment constrained to linear motion in a third direction substantially perpendicular to at least one of said first and second directions, and wherein said grip attachment is configured to couple a grip to said grip module.

2. A force feedback controller according to claim 1, wherein said linear slide mechanism further comprises a linear drive component configured to impart a force on said grip attachment.

3. A force feedback controller according to claim 1, further comprising a first rotational drive component configured to impart a force on said grip module in said first direction.

4. A force feedback controller according to claim 3, further comprising a second rotational drive component configured to impart a force on said grip module in said second direction.

5. A force feedback controller according to claim 1, further comprising:
an upper arm module having a second limb attachment, said second limb attachment configured to couple to a user's upper arm; and
a forearm module having a third limb attachment, said third limb attachment configured to couple to a user's forearm;
wherein said first and second limb attachments are substantially the same as said first limb attachment.

6. A force feedback controller according to claim 1, wherein said first limb attachment includes:
a shell having an upper portion and a lower portion, said upper portion being pivotally and slidably coupled to said lower portion; and
an adjustment mechanism configured to adjust a size of said shell.

7. A force feedback controller according to claim 6, wherein said limb attachment further comprises a viscoelastic foam located on at least a portion of said shell, said viscoelastic foam configured to conform to a contour of a user's arm and resist deformation when exposed to an impulse force.

8. A force feedback controller according to claim 1, wherein said grip attachment includes a first printed circuit board electrical connector and a conductive elastomeric element, said printed circuit board electrical connector and said conductive elastomeric element being designed and configured to form an electrical connection with a second printed circuit board electrical connector of a grip coupled to said grip module.

9. A force feedback controller according to claim 1, wherein said first direction comprises rotation about a first axis, said second direction comprises rotation about a second axis, said second axis being non-parallel with respect to said first axis, and wherein said third direction is substantially perpendicular to at least one of said first axis and said second axis.

10. A force feedback controller according to claim 9, wherein said first axis, said second axis, and said third direction are oriented substantially orthogaonally with respect to each other.

11. A force feedback controller comprising:
a wrist module, said wrist module including a first limb attachment configured to couple to a first portion of a user's arm;
a forearm module, said forearm module including a second limb attachment configured to couple to a second portion of the user's arm; and
an exoskeleton member having a first end a second end, said forearm module coupled to said first end, and said wrist module coupled to said second end, said exoskeleton member including:
a torsion module, said torsion module having a torsion element configured to allow relative torsional movement between said forearm module and said wrist module, and substantially prevent relative axial movement between said forearm module and said wrist module;
wherein at least one of said first and second said limb attachments includes:
a shell having a first flexible portion and a double-walled second portion, said first flexible portion having a first end and a second, and said double-walled second portion having a first and second wall defining a space therebetween, wherein said first end and said second end are each slidably disposed in said space; and an adjustment mechanism configured to fix said first flexile portion relative to said second portion to thereby securely couple said limb attachment to the user's arm.

12. A force feedback controller according to claim 11, wherein said limb attachment further comprises a viscoelastic foam located on at least a portion of said shell, said viscoelastic foam configured to conform to a contour of a user's arm.

13. A force feedback controller comprising:
   a wrist module, said wrist module including a first limb attachment configured to couple to a first portion of user's arm;
   a forearm module, said forearm module including a second limb attachment configure to couple to a second portion of the user's arm;
   an exoskeleton member having a first end and a second end, said forearm module coupled to said first end, and wrist module couple to said second end, said exoskeleton member including; and
      a torsion module, said torsion module having a torsion element configured to allow relative torsional movement between said forearm module and said wrist module, and substantially prevent relative axial movement between said forearm module and said wrist module; an elbow module configure to be removeably coupled to said forearm modulem, said elbow module including:
   a first lateral member pivotally coupled to second lateral member, each of said first and second lateral members having an attachment designed and configured to slidably couple to a third and fourth limb attachments;
   a rotational drive mechanism configured to impart a rotation force on said first and second lateral members, said rotational drive mechanism including an electric motor coupled to one of said first and second lateral members.

14. A force feedback controller elbow module according to claim 13, further comprising a pivot mechanism configured to allow said first lateral member to pivot relative to said second lateral member, said pivot mechanism including a multi-centric hinge.

15. A force feedback controller elbow module according to claim 13, further comprising a pivot mechanism configured to allow said first lateral member to pivot relative to said second lateral member, said pivot mechanism including a variable resistance element configured to controllably adjust a resistance to pivoting said first lateral member relative to said second lateral member.

16. A force feedback controller elbow module according to claim 15, wherein said variable resistance element is selected from the group consisting of 1) a friction element and 2) an electromagnetic element.

17. A force feedback controller exoskeleton comprising:
   a forearm module, a wrist module, and a grip module, said forearm module and said wrist module being designed and configured to removeably couple together to form said force feedback controller exoskeleton, and said grip module coupled to said wrist module and being moveable in a first direction relative to said wrist module; and
   said grip module including a linear slide mechanism and a grip coupled to said linear slide mechanism, the grip movable via the linear slide mechanism in a direction substantially perpendicular to the first direction.

18. A force feedback controller exoskeleton according to claim 17, further comprising an elbow module configured to removeably couple to said forearm module, said elbow module including:
   an elongate receiver and an upper arm module slidably coupled to said elongate receiver, said upper arm module configured to attach said elbow module to a user's arm;
   a first lateral element pivotally coupled to a second lateral element; and
   a drive mechanism configured to drive said first lateral element relative to said second lateral element.

\* \* \* \* \*